V. A. JENKS.
TRUCK.
APPLICATION FILED DEC. 21, 1909.

966,214.

Patented Aug. 2, 1910.
2 SHEETS—SHEET 1.

Witnesses

Inventor
Virgil A. Jenks
By Victor J. Evans
Attorney

V. A. JENKS.
TRUCK.
APPLICATION FILED DEC. 21, 1909.
966,214.
Patented Aug. 2, 1910.
2 SHEETS—SHEET 2.
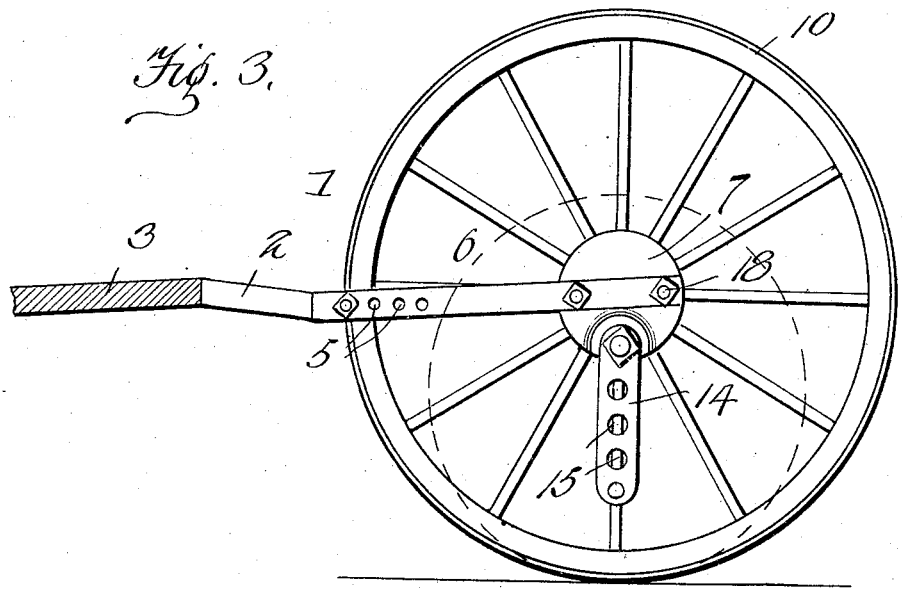
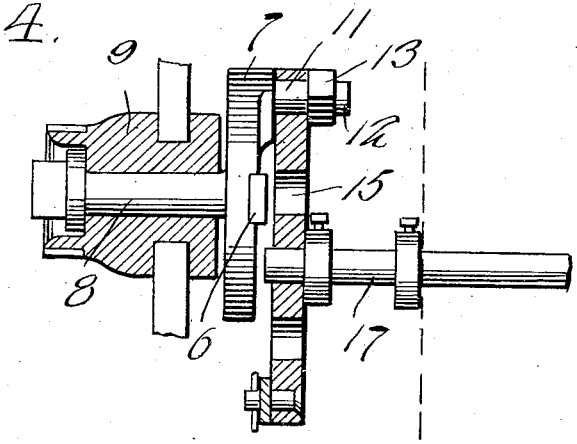
Witnesses
Hugh Hitt
[signature]
Inventor
Virgil A. Jenks
By Victor J. Evans
Attorney

UNITED STATES PATENT OFFICE.

VIRGIL A. JENKS, OF INDIANAPOLIS, INDIANA.

TRUCK.

966,214.　　　Specification of Letters Patent.　　Patented Aug. 2, 1910.

Application filed December 21, 1909. Serial No. 534,307.

*To all whom it may concern:*

Be it known that I, VIRGIL A. JENKS, a citizen of the United States, residing at Indianapolis, in the county of Marion and State of Indiana, have invented new and useful Improvements in Trucks, of which the following is a specification.

This invention relates to improvements in trucks and the object of the invention is to provide a truck which is adapted for handling heavy reels upon which are wound wire, rope, lead pipe or the like and which is provided with means whereby the said reel may be easily and quickly positioned upon the truck with a comparatively slight amount of physical exertion.

With the above and other objects in view, which will appear as the description progresses, the invention resides in the novel construction and combination of parts hereinafter fully described and claimed.

Figure 1:
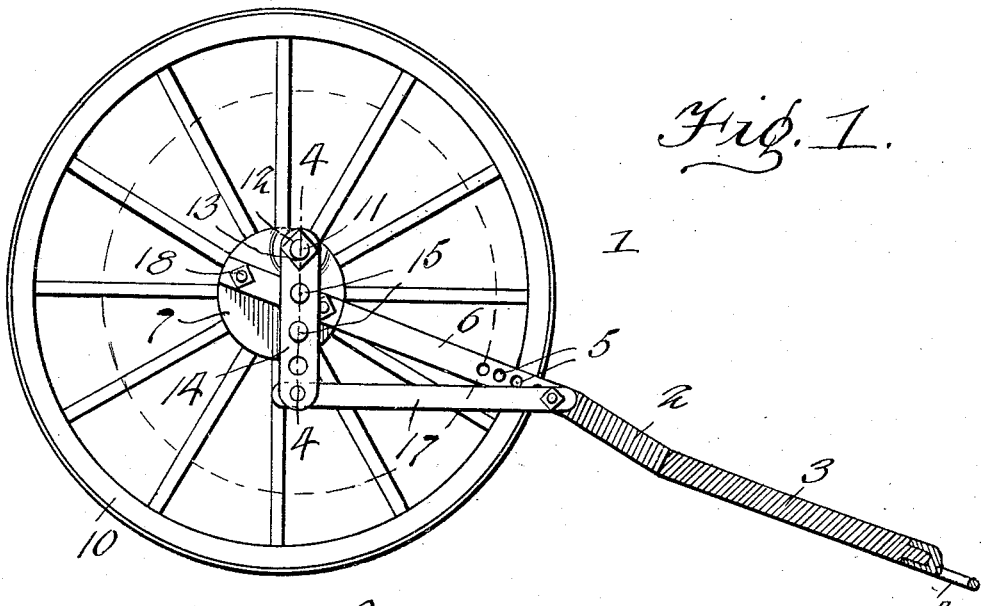
Figure 2:
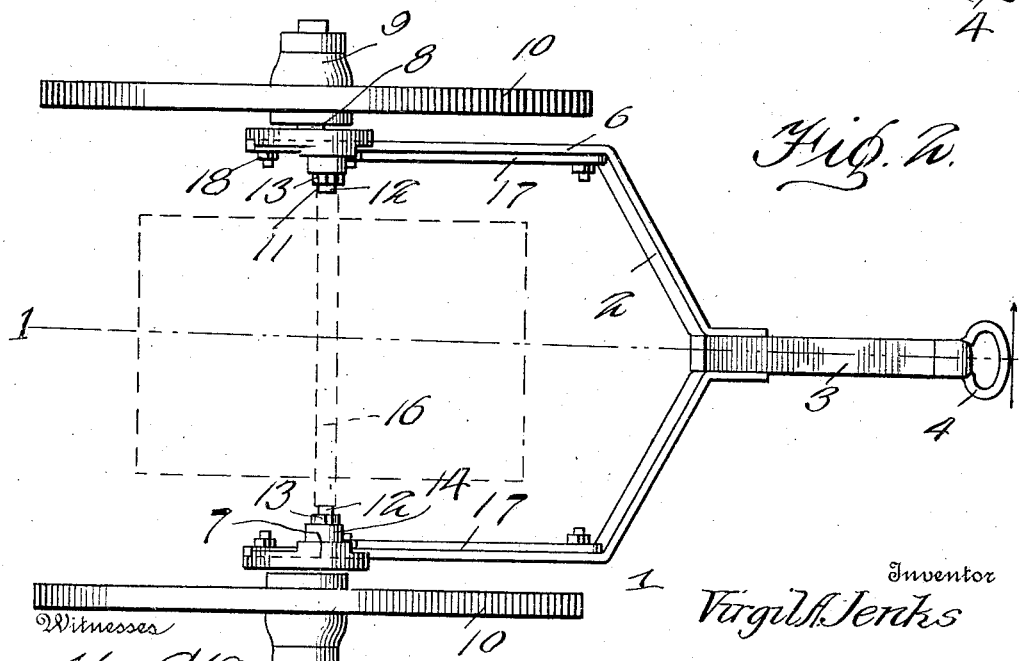

In the accompanying drawings, Figure 1 is a sectional view of a truck constructed in accordance with the present invention taken upon the line 1—1 of Fig. 2. Fig. 2 is a top plan view of the truck. Fig. 3 is a sectional view, similar to Fig. 1 and illustrating a truck in a position to receive the trunnion of the reel, the reel being indicated by the dotted lines. Fig. 4 is a detail enlarged sectional view upon the line 4—4 of Fig. 1.

In the ordinary manner of handling reels of exceedingly heavy weight, upon which is wound wire, lead pipe, heavy rope, etc., it is the practice when positioning the reel upon the truck to jack up the same to the proper height with block and tackles. A shaft is then run through the central bore of the reel and the wheels of the truck are positioned upon each end of this truck. This is a tedious method requiring a great amount of time and labor and at the same time rendering the operation dangerous to the persons handling the reel.

In the accompanying drawings I have provided a simple and effective truck which will entirely obviate the difficulties above mentioned.

In the drawings the numeral 1 designates the truck proper. This truck is provided with a frame 2 having a central pole 3 upon the extremity of which is secured a handhold 4. The frame 2 of the truck comprises a substantially U-shaped member, the arms of which are provided with a plurality of spaced openings designated by the numeral 5, and the purpose of these openings will be presently set forth.

The extremities of the offset arms 6 of the frame are connected with an enlarged disk 7 through the medium of suitable bolts 18. The disks 7 are centrally provided with a shaft 8, which is adapted to be received within the hubs 9 of the wheels 10. The disks 7 are also provided, at determined points, adjacent their peripheries with an outwardly extending stud 11. These studs 11 have their extremities threaded as at 12 and are adapted for the reception of suitable nuts 13. Positioned upon the studs 11 are links 14. These links are provided with a plurality of spaced openings 15, and any one of these openings are adapted for the reception of a shaft 16 upon which the reel is positioned. In attaching the reel to the truck the pole 3 is swung to the position shown in Fig. 3 of the drawings, and the studs 11 revolving with the disk 7 will occupy a position nearest the ground, the links 14 swinging upon the studs 11 will be brought into the position illustrated in Fig. 3 so as to receive the shafts 16 of the reel. When the shaft is secured in any of the openings 15 of the links 14, the pole is swung to its initial position as illustrated in Fig. 1 of the drawings and the reel raised away from the ground and easily transported by the truck.

From the above description, taken in connection with the accompanying drawings, it will be noted that the device above described is simple in construction, comparatively cheap to manufacture and will accomplish the purpose for which it is intended with ease and accuracy.

Having thus fully described the invention, what I claim as new is:—

1. In a truck for the purpose intended, wheels, short axles for the wheels, a disk upon each of the axles, a stud upon each of the disks adjacent their perimeters, a link pivotally connected with each of the studs, said links being provided with a plurality of openings, and a U-shaped frame connecting each of the disks.

2. In a truck for the purpose specified, a pair of wheels, short axles for the wheels, a disk upon each of the short axles, a stud upon each of the disks, a link loosely connected with each of the studs, each of said links being provided with a plurality of spaced openings, a substantially U-shaped frame having its arms connected with each of the disks, and bars connecting each of the disks with the arms of the frame.

In testimony whereof I affix my signature in presence of two witnesses.

VIRGIL A. JENKS.

Witnesses:
    W. M. CASPER,
    EDWARD HUGHES.